(12) United States Patent
Tanaka et al.

(10) Patent No.: US 11,141,803 B2
(45) Date of Patent: Oct. 12, 2021

(54) BROACH

(71) Applicants: MITSUBISHI MATERIALS CORPORATION, Tokyo (JP); TOYOTA MOTOR HOKKAIDO, INC., Tomakomai (JP)

(72) Inventors: You Tanaka, Akashi (JP); Kensuke Kohno, Akashi (JP); Toru Yamazaki, Hokkaido (JP)

(73) Assignees: MITSUBISHI MATERIALS CORPORATION, Tokyo (JP); TOYOTA MOTOR HOKKAIDO, INC., Tomakomai (JP)

( * ) Notice: Subject to any disclaimer, the term of this patent is extended or adjusted under 35 U.S.C. 154(b) by 499 days.

(21) Appl. No.: 16/087,821

(22) PCT Filed: May 10, 2017

(86) PCT No.: PCT/JP2017/017697
§ 371 (c)(1),
(2) Date: Sep. 24, 2018

(87) PCT Pub. No.: WO2017/195829
PCT Pub. Date: Nov. 16, 2017

(65) Prior Publication Data
US 2020/0298326 A1      Sep. 24, 2020

(30) Foreign Application Priority Data
May 12, 2016   (JP) .............................. JP2016-096165

(51) Int. Cl.
*B23F 21/26*    (2006.01)
*B23D 43/02*    (2006.01)

(52) U.S. Cl.
CPC .............. *B23D 43/02* (2013.01); *B23F 21/26* (2013.01)

(58) Field of Classification Search
CPC ....... B23D 43/02; B23D 43/005; B23F 21/26; B23F 1/08
See application file for complete search history.

(56) References Cited

U.S. PATENT DOCUMENTS

| | | |
|---|---|---|
| 5,865,569 A | 2/1999 | Holstein et al. |
| 2004/0109731 A1 | 6/2004 | Weghaus et al. |

(Continued)

FOREIGN PATENT DOCUMENTS

| | | |
|---|---|---|
| CN | 2312782 Y | 4/1999 |
| CN | 1810440 A | 8/2006 |

(Continued)

OTHER PUBLICATIONS

International Search Report dated Aug. 1, 2017, issued for PCT/JP2017/017697 and English translation thereof.

(Continued)

*Primary Examiner* — Rick K Chang
(74) *Attorney, Agent, or Firm* — Locke Lord LLP

(57) ABSTRACT

This broach includes a broach body having a shaft shape and a cutting edge section in which cutting edges protrude and are arranged in a longitudinal direction on an outer circumference of the broach body. The cutting edge section includes, in the order from a front side of the broach body, an circumference cutting section in which an outer diameter of each of the cutting edges sequentially increases rearward, and a tooth thickness cutting section in which a thickness of each of the cutting edges sequentially increases from the cutting edges at a rear end of the circumference cutting section toward the rear side. At least a rear end portion of the circumference cutting section is a high-feed cutting section in which the cutting depth per cutting edge is set in a range of 0.15 mm or more and 0.30 mm or less.

9 Claims, 3 Drawing Sheets

(56) References Cited

U.S. PATENT DOCUMENTS

2014/0294521 A1* 10/2014 Yoshizumi .......... B23D 43/005
    407/13
2016/0250702 A1    9/2016 Yamaya et al.

FOREIGN PATENT DOCUMENTS

| CN | 201361748 Y | 12/2009 |
|----|---|---|
| CN | 103068509 A | 4/2013 |
| CN | 103752942 A | 4/2014 |
| JP | 64-034605 A | 2/1989 |
| JP | 06-315820 A | 11/1994 |
| JP | 2003-025141 A | 1/2003 |
| JP | 2004-306148 A | 11/2004 |
| WO | 2015/080122 A1 | 6/2015 |

OTHER PUBLICATIONS

Office Action dated Nov. 4, 2019, issued for the Chinese patent application No. 201780023005.8 and a partial English translation of Search Report.

Supplementary European Search Report dated Dec. 5, 2019, issued for the European patent application No. 17796189.3.

* cited by examiner

BROACH

TECHNICAL FIELD

The present invention relates to a broach that has a shaft-shaped broach body and a cutting edge section formed on the outer circumference of the broach body, a plurality of cutting edges protruding from the cutting edge section are arranged in a longitudinal direction of the broach body, and the broach can be used for broaching of workpieces such as internal gears.

Priority is claimed on Japanese Patent Application No. 2016-96165, filed on May 12, 2016, the content of which is incorporated herein by reference.

BACKGROUND ART

As an example of broaching of such an internal gear, for example, Patent Document 1 discloses machining internal helical gears having helically twisted gullets by means of a helical broach. The internal helical gears are widely used in an automotive transmission or the like. The helical broach includes roughing edges (circumference cutting teeth) that roughly cut a tooth profile by circumference cutting and finishing edges (tooth thickness cutting teeth) that finish the tooth profile by tooth thickness cutting.

In such a helical broach, the roughing edges are disposed on a front side of the broach body, and the finishing edges are disposed on a rear side. The roughing edges on the front side are formed such that the outer diameter of each of cutting edges thereof sequentially increases toward the rear side. The finishing edges on the rear side are formed such that the thickness of each of the cutting edges in a broach body circumferential direction sequentially increases toward the rear side. When the front end of the broach is inserted through a hole in a workpiece and the broach is pulled out, gullets having a predetermined depth are formed in the workpiece by the roughing edge, tooth flanks of the gullets are driven in the circumferential direction, and each width of gullet is widened to finish the tooth flanks by the finishing edge. In general, since the outer diameter of each of the cutting edges sequentially increases toward the rear side at a constant rate, the cutting depth per cutting edge of the roughing edge is also constant. That is, the difference between two cutting edges adjacent to each other in the broach body longitudinal direction in the roughing edge is constant, and the difference is approximately 0.07 mm to 0.08 mm in general.

CITATION LIST

Patent Literature

[Patent Document 1] Japanese Unexamined Patent Application, First Publication No. 2004-306148

SUMMARY OF INVENTION

Technical Problem

In such a helical broach, the cutting edges of the roughing edge and the cutting edges of the finishing edge are arranged along a helix twisted about an axis of the broach body. The helical gullets are formed in a workpiece by pushing the broach body to the front side while relatively rotating with respect to the workpiece. In the broach of the related art, at the time of circumference cutting by the roughing edge, generated chips interfere with the surfaces of obtuse angle side of the gullets formed in the workpiece, and generate a force pushing the cutting edges toward the acute angle side of the gullets. Therefore, the cutting edges excessively cut into the workpiece toward the acute angle side and deviate from target positions of tooth flanks to be formed, and thus excessive cutting is occurred.

Consequently, in the gullets to be formed in the workpiece to a predetermined depth, the tooth flanks of the obtuse angle side are inclined to the acute angle side, thereby causing a forming error. In this case, since the finishing edges following the roughing edges are guided by the tooth flanks where the forming error has occurred, all of the tooth flanks undergo tooth thickness cutting while being deviated in the circumferential direction. Thus, there is a possibility that so-called tip fall occurs, and gullets cannot be suitably cut by the finishing edge at obtuse angle side, and the accuracy of finishing-cut tooth profiles is also impaired.

In addition, since the cutting depth per cutting edge of the roughing edge is small as described above, gullets having a desired depth cannot be formed if the number of the cutting edges in the roughing edge is not considerably large. For this reason, the length of the broach body is also required to be increased to approximately 2 m, thereby increasing the weight of the broach body. Therefore, ease of handling is impaired.

The invention is made in view of the circumstances, and an object thereof is to provide a broach that can perform highly accurate broaching by preventing tooth profile accuracy degradation of gullets formed in a workpiece and can improve ease of handling by achieving shortening and weight reduction of a broach body.

Solution to Problem

As a result of thorough research by an inventor of the invention, it was found that, when the cutting depth of, in particular, the circumference cutting teeth of the helical broach is increased, chip-flowing angle at which chips flow toward tooth flanks of the obtuse angle side decreases, and action of pushing cutting edges to the acute angle side decreases. Accordingly, it was found that excessive cutting of the cutting edge to the acute angle side reduces, and the shape of each tooth flank of obtuse side at the time of processing by the roughing edge was improved.

The invention is to achieve the object based on such findings, and provides a broach comprising a broach body formed in a shaft shape; and a cutting edge section formed on an outer circumference of the broach body, and the cutting edge section has a plurality of cutting edges that protrude from an outer circumference of the broach body and are arranged in a longitudinal direction of the broach body. The cutting edge section includes, in order from a front side in the longitudinal direction of the broach body: an circumference cutting section in which an outer diameter of each of the cutting edges sequentially increases toward a rear side, and a tooth thickness cutting section in which a thickness of each of the cutting edges in a broach body circumferential direction sequentially increases from the cutting edge at a rear end of the circumference cutting section toward the rear side. A high-feed cutting section, in which an outer diameter of each of the cutting edges sequentially increases toward the rear side of the broach body, is disposed in at least a rear end portion of the circumference cutting section, and a cutting depth per cutting edge in the high-feed cutting section is set in a range of 0.15 mm or more and 0.30 mm or less.

When broaching is performed onto a workpiece by the broach having such a configuration, since the cutting depth per cutting edge in at least the rear end portion of the circumference cutting section is in a range of 0.15 mm or more and 0.30 mm or less, and thus the high-feed cutting section has a cutting depth that is at least two to three times larger than the cutting depth of the circumference cutting section of the related art, the angle at which chips flow toward the tooth flank of obtuse side (angle formed between a moving direction of the cutting edges 5 and a chip flowing direction) decreases, the action of pushing the cutting edges toward the acute angle side decreases, and the cutting edges cut less forward on the acute angle side, in accordance with the finding. Therefore, the tooth flank of obtuse side can be prevented from inclining to the acute angle side, and the degradation of tooth profile accuracy can be prevented.

In addition, by increasing the cutting depth per cutting edge in the high-feed cutting section of the circumference cutting section as described above, the number of the cutting edges necessary for the circumference cutting section can be decreased. For this reason, the length of the cutting edge section in the longitudinal direction of the broach body can be shortened, and the weight of the broach body can be reduced, thereby improving ease of handling.

When the cutting depth per cutting edge of the high-feed cutting section in the circumference cutting section is smaller than the range, a cutting load exerted at the time of circumference cutting for the high-feed cutting section is insufficient. Thus, there is a possibility that the tooth flank of obtuse side cannot be sufficiently prevented from inclining to the acute angle side and also shortening and weight reduction of the broach body are insufficient. When the cutting depth per cutting edge of the high-feed cutting section is larger than the range, chips generated by the cutting edges are excessively thick, and the capacity of each chip room accommodating the chips is insufficient, thereby causing chip clogging. For this reason, in the invention, the cutting depth per cutting edge in the high-feed cutting section is set to be in a range of 0.15 mm or more and 0.30 mm or less.

The entire circumference cutting section in the cutting edge section of the broach body may be the high-feed cutting section described above, but there is a possibility that when the cutting depth per cutting edge is large from the beginning when the circumference cutting section starts to cut into the workpiece, the workpiece or the broach body receives a shock load, and tooth profile accuracy degradation and damage to the cutting edges caused by rattling occur. For this reason, it is desirable that a front end portion of the circumference cutting section be a low-feed cutting section, in which the cutting depth per cutting edge is set to be in a range that is smaller than that of the high-feed cutting section, and a shock load exerted at the beginning of cutting be avoided. In addition, from the low-feed cutting section to the high-feed cutting section, the cutting depth may be continuously increased, may be discontinuously increased, or may be increased step by step. The length of the high-feed cutting section may be 40% or more and 100% or less of the overall length of the circumference cutting section, or for example, may be approximately 50% or more and 80% or less of the overall length. In addition, the cutting depth per cutting edge in the low-feed cutting section on the front side of the circumference cutting section may be in a range of 0.03 mm or more and 0.15 mm or less, or for example, may be in a range of 0.07 mm or more and 0.08 mm or less.

Advantageous Effects of Invention

As described above, according to the invention, the tooth profile accuracy of the gullets formed in the workpiece can be prevented from degrading, and ease of handling can be improved by shortening and weight reduction of the broach body.

DESCRIPTION OF EMBODIMENTS

Figure 1:
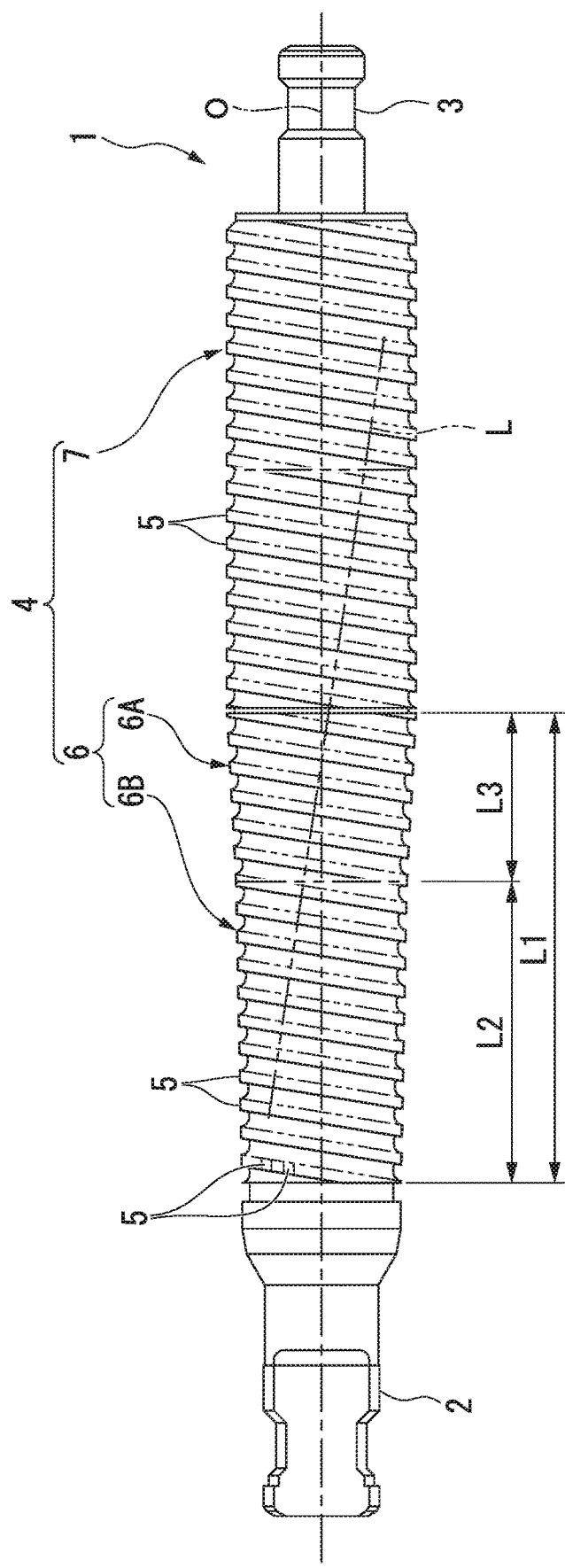
FIG. 1 is a side view showing an embodiment of the invention.
Figure 2:
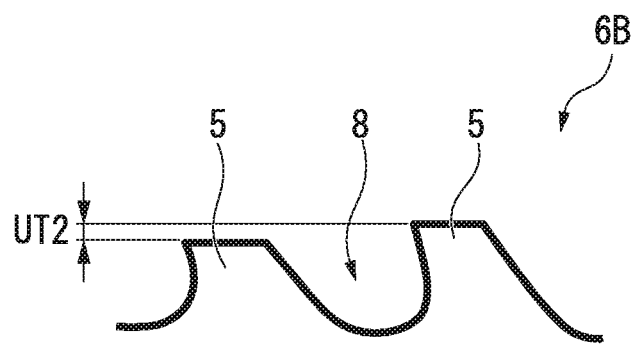
FIG. 2 is a side view showing a cutting edge of a low-feed cutting section in an circumference cutting section of the embodiment shown in FIG. 1.
Figure 3:
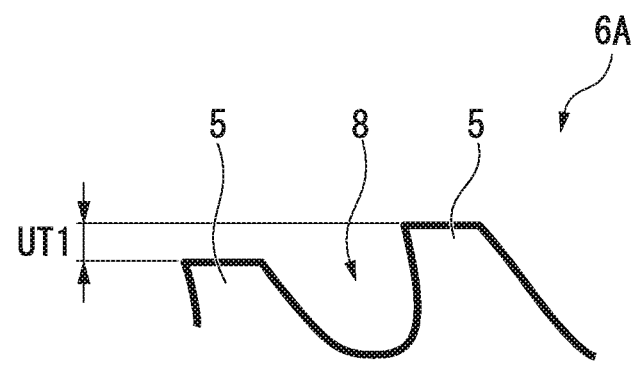
FIG. 3 is a side view showing a cutting edge of a high-feed cutting section in the circumference cutting section of the embodiment shown in FIG. 1.

FIGS. 1 to 3 show an embodiment of a broach of the invention. The broach of the embodiment is a helical broach that processes, for example, an internal helical gear used in the automotive transmission described above. A broach body 1 is formed of a hard material, such as high-speed tool steel, and in a long shaft shape about an axis O. A front grip 2 is formed in a front end portion (left portion in FIG. 1) of the broach body 1, and a rear grip 3 is formed in a rear end portion (right portion in FIG. 1). A cutting edge section 4 is formed between the front grip 2 and the rear grip 3.

This helical broach is supported by a broaching machine by grasping the front grip 2 and the rear grip 3 after the broach is inserted into an inner circumference of an annular workpiece (not shown) from a front side thereof. The helical broach is pushed and inserted into the workpiece to a relatively front side in an axis O direction, and is simultaneously rotated about the axis O. Then, the cutting edge section 4 cuts a plurality of helical gullets in the inner circumference of the workpiece to form a tooth profile, such as the internal helical gear, between the gullets.

In the cutting edge section 4, a plurality of (multiple) cutting edges 5 protruding to an outer circumference of the broach body 1 are arranged at intervals in the axis O direction of the broach body 1 (longitudinal direction) and at intervals in a circumferential direction. In the circumferential direction, the cutting edges 5 are arranged at equal intervals in accordance with intervals of the gullets to be formed in the inner circumference of the workpiece. In the axis O direction, the cutting edges form a cutting edge array at intervals along a lead (pitch helix) L twisted about the axis O so as to correspond to a helix formed by the gullets.

The cutting edge section 4 where the cutting edges 5 are arranged includes, in the order from the front side to a rear side in the axis O direction, an circumference cutting section 6 (roughing edges) and a tooth thickness cutting section 7 (finishing edges). In the circumference cutting section 6, the outer diameter of each of the cutting edges 5 from the axis O sequentially increases toward the rear side. In the tooth thickness cutting section 7, the cutting edges 5 are formed so as to be continuous from the cutting edges 5 of a rear end of the circumference cutting section 6, and the thickness of each of the cutting edges 5 in the circumferential direction of the broach body 1 sequentially increases toward the rear side. The tooth thickness cutting section 7 may be formed to be integrated with the broach body 1 along with the circumference cutting section 6. Alternatively, the tooth thickness cutting section 7 may be formed separately from the broach body 1, and be formed on an outer circumferential surface of a cylindrical shell, which is a coaxial shell detachable to the broach body 1.

At least a rear end portion, out of portions of the circumference cutting section 6, is a high-feed cutting section 6A, in which the outer diameter of each of the cutting edges 5 sequentially increases toward the rear side. As shown in FIG. 3, in the high-feed cutting section 6A, a cutting depth UT1 per cutting edge in the axis O direction is set to be in a range of 0.15 mm or more and 0.30 mm or less. The cutting depth UT1 may be in a range of 0.20 mm or more and 0.28 mm or less. In the embodiment, only a portion (length L3) within a predetermined range on a rear side of the circumference cutting section 6 (length L1) is the high-feed cutting section 6A, and a portion (length L2) on a front side of the high-feed cutting section 6A of the circumference cutting section 6 is a low-feed cutting section 6B. As shown in FIG. 2, in the low-feed cutting section 6B, a cutting depth UT2 per cutting edge is set to be in a range smaller than that of the high-feed cutting section 6A.

Although the length L3 of the high-feed cutting section 6A is not limited, the length L3 may be, for example, 40% or more and 100% or less (or less than 100%) of the length L1 of the circumference cutting section 6, or more preferably, may be 50% or more and 80% or less of the length L1. If the length L3 is in the range, the start of cutting by the broach becomes smooth, and it is easy to avoid a shock load exerted to the workpiece or the broach body 1.

The high-feed cutting section 6A and the low-feed cutting section 6B are continuous in the embodiment. However, between the high-feed cutting section 6A and the low-feed cutting section 6B, an intermediate region where the cutting depth per cutting edge gently increases may be provided, or an intermediate region where the cutting depth per cutting edge increases through two or more steps may be provided. When the cutting depth per cutting edge at a front end of the circumference cutting section 6 is set as UT1 and the cutting depth per cutting edge at the rear end of the circumference cutting section 6 is set as UT2, a configuration where the cutting depth per cutting edge increases continuously or step by step from the front end to the rear end of the circumference cutting section 6 may be adopted. In this case, a location having an intermediate value of UT1 and UT2 is a boundary between the high-feed cutting section 6A and the low-feed cutting section 6B.

In the embodiment of FIG. 1, the cutting depth UT1 per cutting edge in the high-feed cutting section 6A is constant, and the cutting depth UT2 per cutting edge in the low-feed cutting section 6B is also constant. The cutting depth UT2 per cutting edge in the low-feed cutting section 6B may be approximately 0.03 mm or more and less than 0.15 mm, or for example, may be approximately 0.07 mm or more and 0.08 mm or less. In both of the high-feed cutting section 6A and the low-feed cutting section 6B, a portion having a section recessed in an arc-shape between the cutting edges 5 arranged along the lead L is set as a chip room 8 accommodating a chip generated by each of the cutting edges 5.

In the broach having such a configuration, at least the rear end portion of the circumference cutting section 6 is the high-feed cutting section 6A, and the cutting depth UT1 per cutting edge in the high-feed cutting section 6A is set in a relatively larger range of 0.15 mm or more and 0.30 mm or less. Therefore, when the cutting edges 5 of the high-feed cutting section 6A cut into the workpiece, an angle at which a chip generated by the cutting edge 5 flows on an tooth flank of obtuse side (angle formed between a moving direction of the cutting edges 5 and a chip flowing direction) decreases and the action of the chip pushing the cutting edge 5 toward the acute angle side tooth flank decreases, thereby causing the cutting edges 5 to cut less forward on an acute angle side. Accordingly, the shape of the tooth flank of obtuse side during processing by the roughing edge is improved, and tooth profile accuracy degradation can be prevented.

In addition, as the cutting depth UT1 per cutting edge in the high-feed cutting section 6A of the circumference cutting section 6 increases as described above, the number of the cutting edges 5 necessary for the circumference cutting section 6 can be decreased. Therefore, the length of the cutting edge section 4 in the longitudinal direction of the broach body 1 can be shortened, and also the weight of the broach body 1 can be reduced. Consequently, ease of handling of the broach body 1 can be improved. An increase in the cutting depth from the cutting depth UT2 of the low-feed cutting section 6B to the cutting depth UT1 of the high-feed cutting section 6A may be a continuous increase at a constant increasing rate, may be a discontinuous increase at a non-constant increasing rate, or may be a gradual increase, in which a cutting depth is constant and again increases after increasing continuously or discontinuously.

As will be demonstrated in examples to be described later, when the cutting depth UT1 per cutting edge of the high-feed cutting section 6A is smaller than the range, a cutting load exerted at the time of circumference cutting for the high-feed cutting section 6A is insufficient. Thus, there is a possibility that an tooth flank of obtuse side cannot be sufficiently prevented from inclining to the acute angle side and also shortening and weight reduction of the broach body 1 are insufficient. On the contrary, when the cutting depth UT1 per cutting edge of the high-feed cutting section 6A is larger than the range, a chip generated by the cutting edge 5 is excessively thick, and the capacity of the chip room 8 accommodating the chip becomes insufficient, and chip clogging is thereby caused.

On the other hand, in the embodiment, as described above, the high-feed cutting section 6A having the large cutting depth UT1 is only the rear end portion of the circumference cutting section 6, and the front end portion of the circumference cutting section 6 is a low-feed cutting section 6B having the cutting depth UT2 set to be smaller than the range of the cutting depth UT1 of the high-feed cutting section 6A. For this reason, since the cutting edges 5 in the low-feed cutting section 6B, which is at the forefront of the cutting edge section 4 of the broach body 1 and cuts into a workpiece first, cut into the workpiece by the small cutting depth UT2, a shock load exerted to the workpiece or the broach body 1 at the beginning of cutting can be avoided, and tooth profile accuracy degradation and damage to the cutting edges 5 caused by rattling can be prevented from occurring.

EXAMPLES

Next, effects of the invention will be demonstrated with examples of the invention.

Example 1

Based on the embodiment, a helical broach was made such that the cutting depth UT1 per cutting edge in the high-feed cutting section 6A on the rear side of the circumference cutting section 6 was set to 0.15 mm and a cutting depth per cutting edge of the cutting edges 5 in the low-feed cutting section 6B that was on the front side was set to 0.07 mm. The outer diameter of a front end of the low-feed cutting section 6B was 93.2 mm, and an overall length L2 of the low-feed cutting section 6B was 120 mm. The outer diameter of a rear end of the high-feed cutting section 6A was 98.6 mm, and an overall length L3 of the high-feed cutting section 6A was 340 mm. The pitch of the cutting edges 5 in the axis O direction was 11 mm. Since the tooth thickness cutting section 7 did not perform finishing, a description of the tooth thickness cutting section 7 is omitted.

Example 2

A helical broach was made such that the cutting depth UT1 per cutting edge in the high-feed cutting section 6A on the rear side of the circumference cutting section 6 was set to 0.30 mm and a cutting depth per cutting edge of the cutting edges 5 in the low-feed cutting section 6B that was on the front side was set to 0.07 mm. The outer diameter of the front end of the low-feed cutting section 6B was 93.2 mm, and the overall length L2 of the low-feed cutting section 6B was 120 mm. The outer diameter of the rear end of the high-feed cutting section 6A was 98.6 mm, and the overall length L3 of the high-feed cutting section 6A was 170 mm. The pitch of the cutting edges 5 in the axis O direction was the same as that of Example 1.

Comparative Example 1

A helical broach having a constant cutting depth per cutting edge of 0.07 mm over an overall length of the circumference cutting section 6 was made. The outer diameter of the front end of the circumference cutting section 6 was 93.2 mm, the outer diameter of the rear end was 98.6 mm, and the overall length of the circumference cutting section 6 was 850 mm. The pitch of the cutting edges 5 in the axis O direction was the same as that of Example 1.

Comparative Example 2

A helical broach was made such that the cutting depth UT1 per cutting edge in the high-feed cutting section 6A on the rear side of the circumference cutting section 6 was set to 0.10 mm and a cutting depth per cutting edge of the cutting edges 5 in the low-feed cutting section 6B that was on the front side was set to 0.07 mm. The outer diameter of the front end of the low-feed cutting section 6B was 93.2 mm, and the overall length L2 of the low-feed cutting section 6B was 120 mm. The outer diameter of the rear end of the high-feed cutting section 6A was 98.6 mm, and the overall length L3 of the high-feed cutting section 6A was 510 mm. The pitch of the cutting edges 5 in the axis O direction was the same as that of Example 1.

Figure 4:
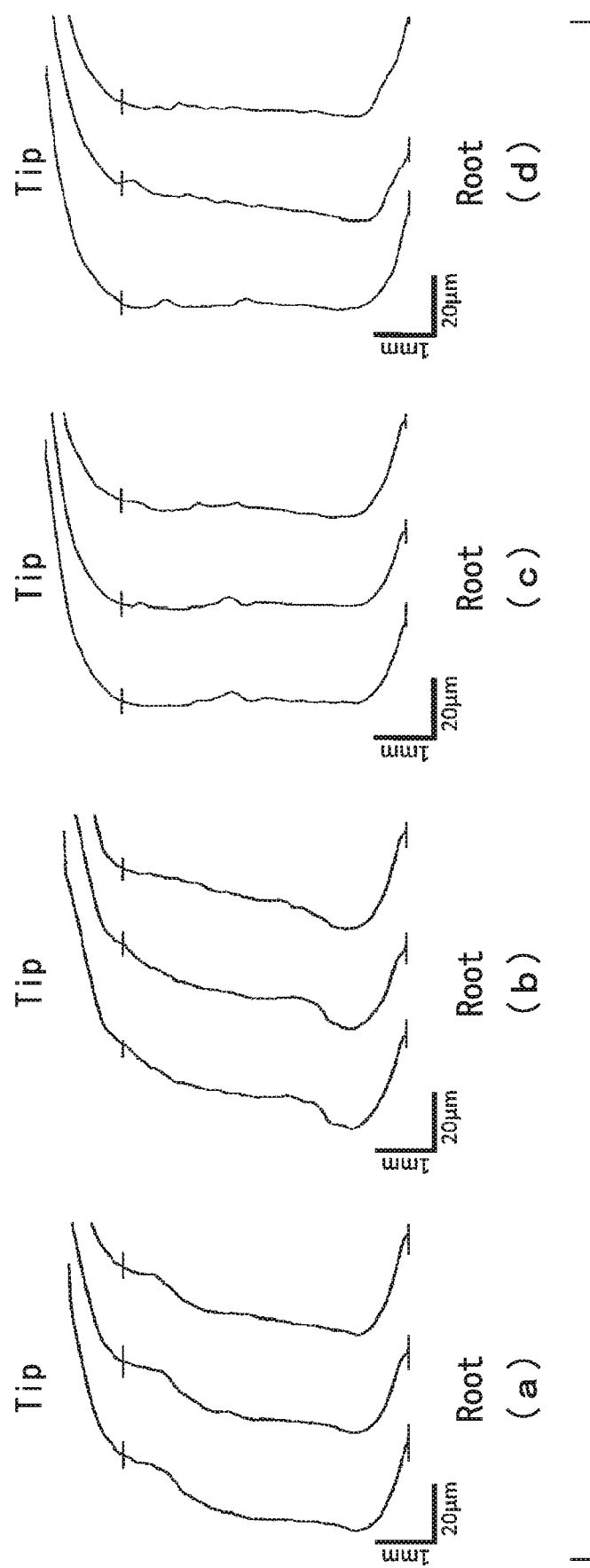
FIG. 4 is a graph showing a tooth profile error of an tooth flank of obtuse side of a gullet formed in examples and comparative examples of the invention.

The helical broaches of Examples 1 and 2 and Comparative Examples 1 and 2 performed broaching on an annular workpiece (a length of 18 mm, and an inner diameter of 93.1 mm) made of S45C (carbon steel for machine structural use), and a tooth profile measurer measured a tooth profile error in an tooth flank of obtuse side of each of three gullets of the workpiece after the processing. Processing conditions were set such that a speed at which the broach pushes in was 6 m/min and the tooth thickness cutting section 7 did not perform finishing. The results of Comparative Examples 1 and 2 and Examples 1 and 2 are shown in FIG. 4 (a) to (d) in this order. Three lines of each graph indicate tooth profile errors of the three gullets. "Tip" indicates an edge tip side.

"Root" indicates a tooth root side. As a tooth profile error decreases, a graph close to a horizontal straight line was obtained.

From the results of FIG. 4, it was found that an tooth flank of obtuse side was significantly collapsed in the helical broach of Comparative Example 1, in which a cutting depth per cutting edge of the cutting edges of the circumference cutting section was constant at 0.07 mm, and the helical broach of Comparative Example 2 in which a cutting depth per cutting edge in the rear end portion of the circumference cutting section was 0.10 mm that was smaller than the range of the invention.

On the contrary, it was known that a surface of an tooth flank of obtuse side was prevented from inclining in Examples 1 and 2 according to the invention compared to Comparative Examples 1 and 2.

In addition, the highest cutting load at the time of processing of Comparative Example 1 was 27 kN and the highest cutting load was 35 kN at the time of processing of Comparative Example 2 while the highest cutting load was 41 kN at the time of processing of Example 1 and the highest cutting load was 55 kN at the time of processing of Example 2.

Comparative Example 3

As Comparative Example 3, a helical broach was made such that the cutting depth UT1 per cutting edge in the high-feed cutting section 6A on the rear side of the circumference cutting section 6 was set to 0.315 mm and the cutting depth per cutting edge of the cutting edges 5 in the low-feed cutting section 6B that was on the front side was set to 0.07 mm. The outer diameter of the front end of the low-feed cutting section 6B was 93.2 mm, and the overall length L2 of the low-feed cutting section 6B was 120 mm. The outer diameter of the rear end of the high-feed cutting section 6A was 98.6 mm, and the overall length L3 of the high-feed cutting section 6A was 162 mm. The pitch of the cutting edges 5 in the axis O direction was the same as that of Example 1.

Next, the chip discharge ability of each of the helical broaches of Example 1, 2, and Comparative Examples 1, 2, and 3 when broaching was performed on a workpiece under the same cutting conditions was checked. As a result, it was checked that while chips were naturally discharged from chip rooms for one time of broaching in the helical broaches of Examples 1 and 2 and Comparative Examples 1 and 2, chips were not naturally discharged from chip rooms in the helical broach of Comparative Example 3 and chip clogging occurred when broaching was continuously performed.

From these results, it was found that there was an effect of setting the cutting depth UT1 per cutting edge of the high-feed cutting section 6A in the circumference cutting section 6 to be in a range of 0.15 mm or more and 0.30 mm or less.

INDUSTRIAL APPLICABILITY

According to the invention, industrial application is possible since the tooth profile accuracy of the gullets formed in the workpiece can be prevented from degrading, and ease of handling can be improved by shortening and weight reduction of the broach body.

REFERENCE SIGNS LIST

1: broach body
4: cutting edge section

5: cutting edge
6: circumference cutting section
6A: high-feed cutting section
6B: low-feed cutting section
7: tooth thickness cutting section
8: chip room
UT1: cutting depth per cutting edge in high-feed cutting section 6A
UT2: cutting depth per cutting edge in low-feed cutting section 6B
O: axis of broach body 1
L: lead on which an array of cutting edges 5 are arranged (pitch helix)

The invention claimed is:

1. A broach comprising:
a broach body having a shaft shape; and
a cutting edge section formed on an outer circumference of the broach body, the cutting edge section having a plurality of cutting edges that protrude from the outer circumference of the broach body and are arranged in a longitudinal direction of the broach body;
wherein the cutting edge section includes, in order from a front side in the longitudinal direction of the broach body:
a circumference cutting section in which an outer diameter of each of the cutting edges of the circumference cutting section sequentially increases toward a rear side of the broach body, and
a tooth thickness cutting section in which a thickness of each of the cutting edges in a circumferential direction of the broach body sequentially increases from the cutting edge section at a rear end of the circumference cutting section toward the rear side of the broach body,
a high-feed cutting section, in which an outer diameter of each of the cutting edges of the high-feed cutting section sequentially increases toward the rear side of the broach body, is disposed in at least a rear end portion of the circumference cutting section, and
a cutting depth per cutting edge in the high-feed cutting section is set in a range of 0.15 mm to 0.30 mm.

2. The broach according to claim 1,
wherein a front end portion of the circumference cutting section is a low-feed cutting section where the cutting depth per cutting edge is set in a range that is smaller than that of the high-feed cutting section.

3. The broach according to claim 2,
wherein the cutting depth per cutting edge in the low-feed cutting section on the front side of the circumference cutting section is in a range of 0.03 mm to 0.15 mm.

4. The broach according to claim 3,
wherein a length of the high-feed cutting section is 40% to 100% of an overall length of the circumference cutting section.

5. The broach according to claim 2,
wherein a length of the high-feed cutting section is 40% to 100% of an overall length of the circumference cutting section.

6. The broach according to claim 2,
wherein the cutting depth per cutting edge in the low-feed cutting section on the front side of the circumference cutting section is in a range of 0.03 mm to 0.08 mm.

7. The broach according to claim 1,
wherein a length of the high-feed cutting section is 40% to 100% of an overall length of the circumference cutting section.

8. The broach according to claim 1,
wherein the cutting edges of the cutting edge section form a cutting edge array at intervals along a lead twisted about the axis of the broach body.

9. The broach according to claim 1,
wherein the length of the high-feed cutting section is 40% to 80% of the overall length of the circumferential cutting section.

* * * * *